Patented Aug. 18, 1925.

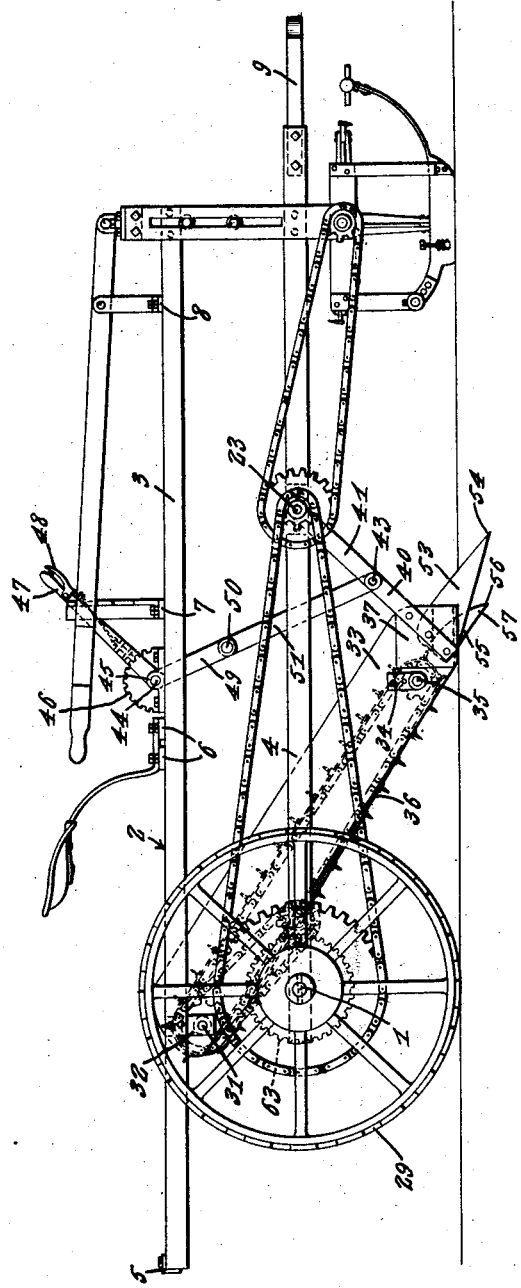

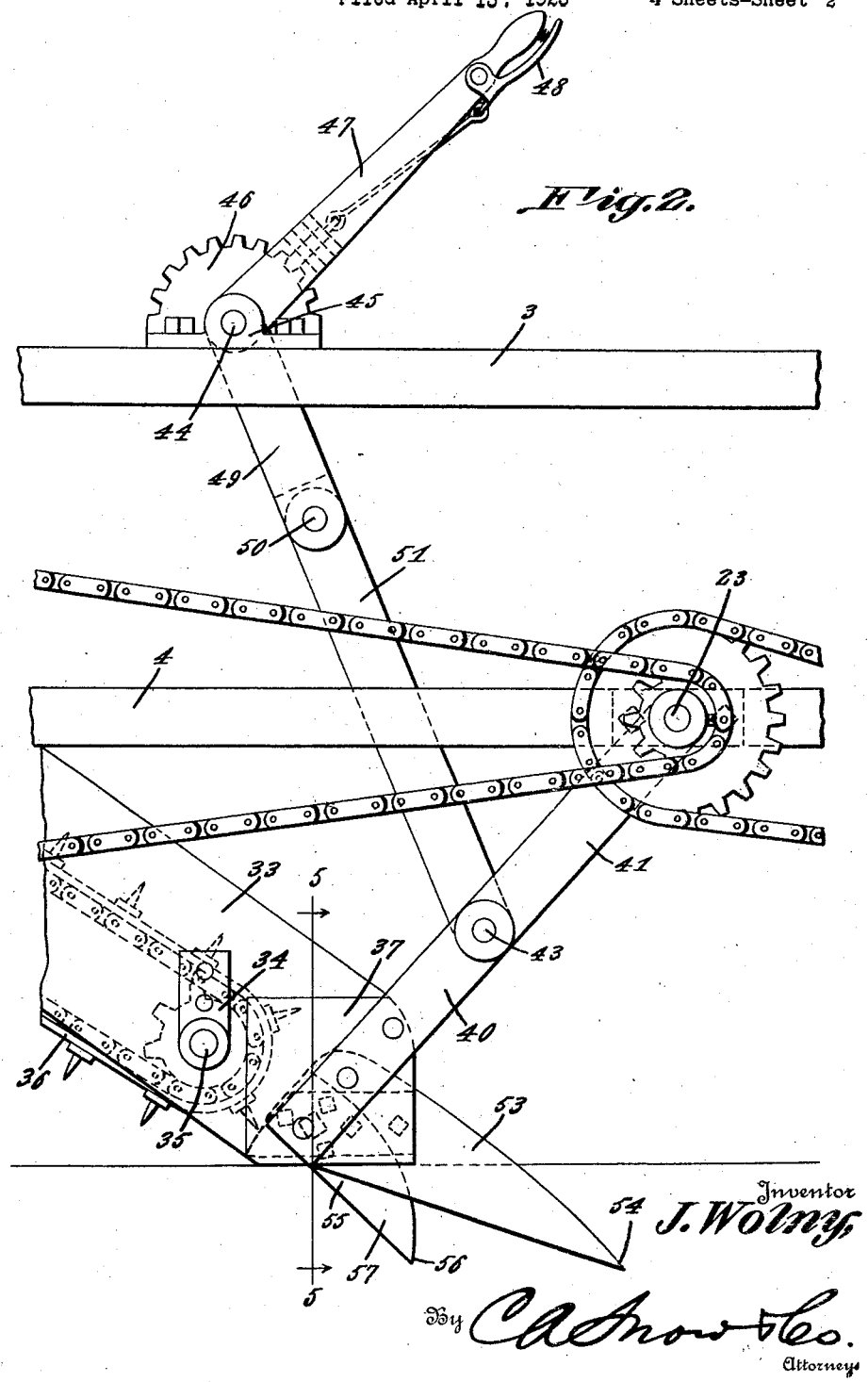

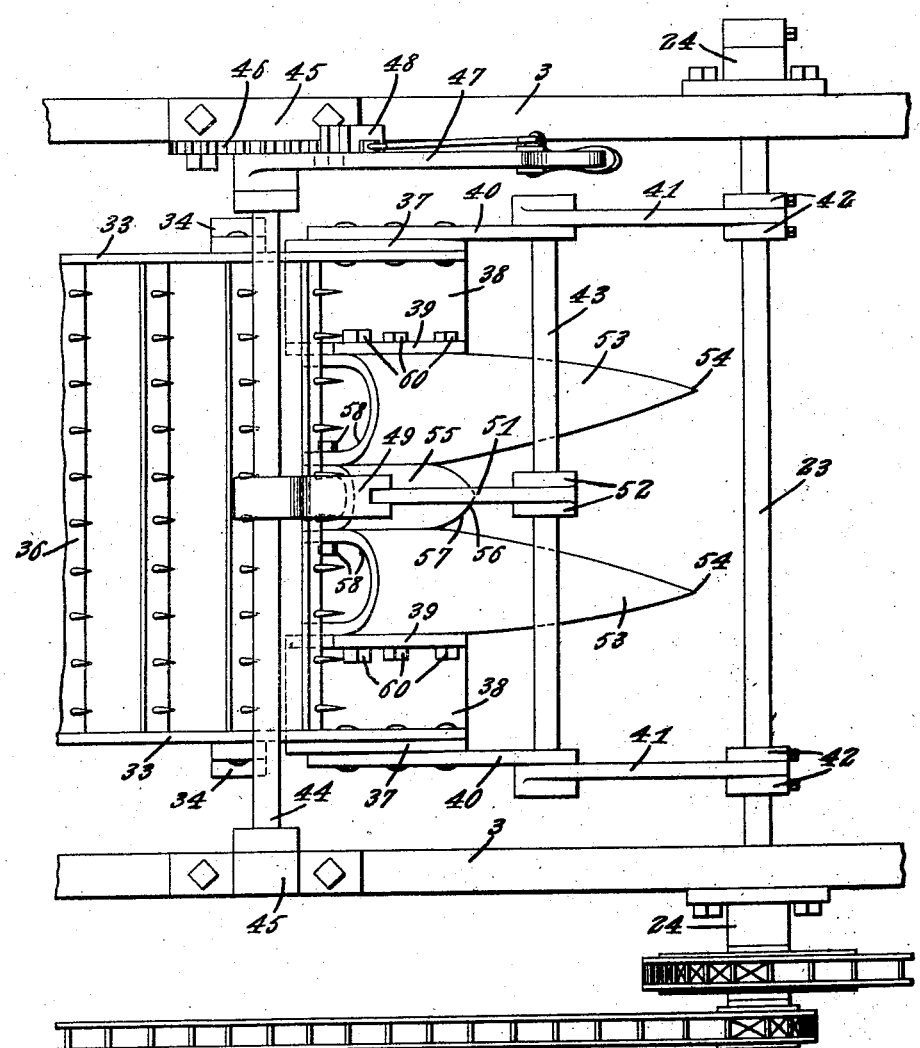

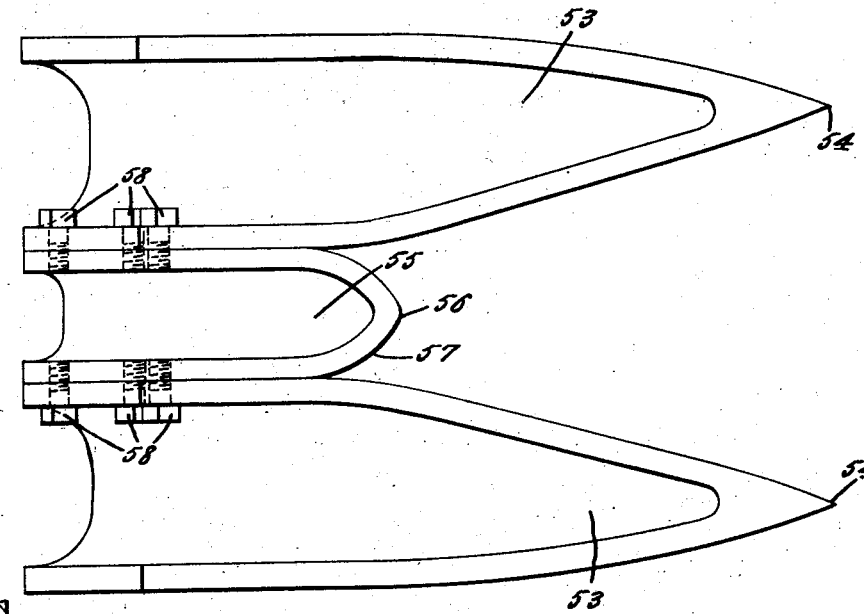
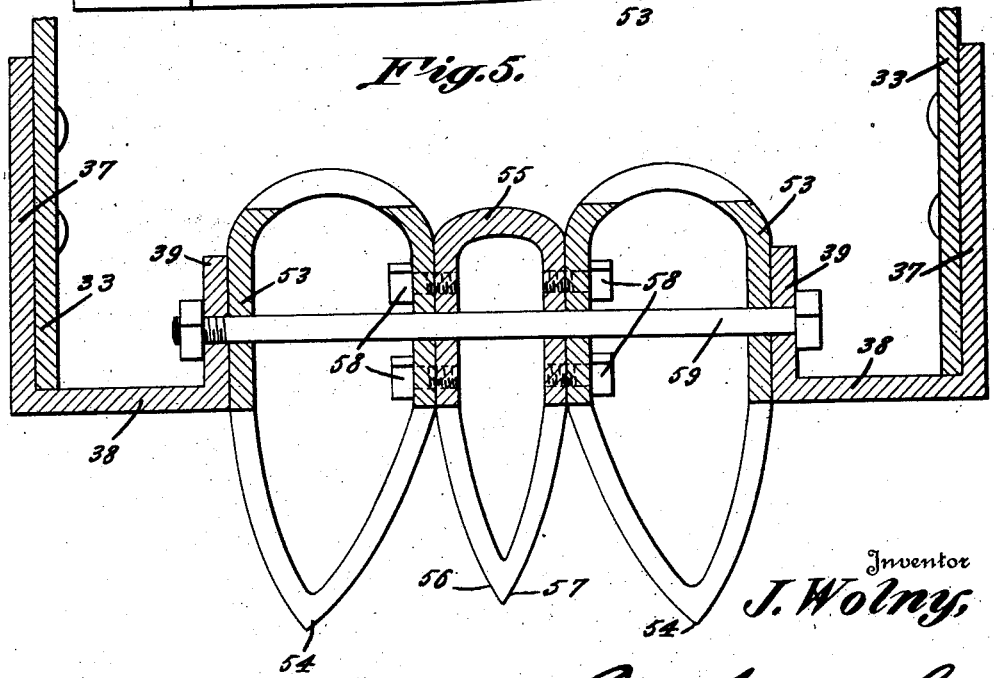

1,550,602

UNITED STATES PATENT OFFICE.

JOSEPH WOLNY, OF CARNEYVILLE, WYOMING.

BEET DIGGER.

Application filed April 13, 1923. Serial No. 631,878.

*To all whom it may concern:*

Be it known that I, JOSEPH WOLNY, a citizen of the United States, residing at Carneyville, in the county of Sheridan and State of Wyoming, have invented a new and useful Beet Digger, of which the following is a specification.

The device forming the subject matter of this application constitutes a part of a compound machine embodying a beet topper, a beet loader or elevator, and a beet digger. The beet digger forms the subject matter of this application, whereas the topper is shown in my co-pending application Serial No. 662,286, filed on the 12th day of September, 1923.

Referring specifically to the digger which forms the subject matter of this application, it may be stated that it is one object of the invention to improve the means whereby the beets are dug immediately out of the ground. Another object of the invention is to provide novel means for effecting a vertical adjustment of the digging instrumentalities.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation a device constructed in accordance with the invention; Figure 2 is a side elevation showing the means whereby the digging instrumentalities are raised and lowered; Figure 3 is a fragmental top plan showing the digging means; Figure 4 is a bottom plan of the digging means; and Figure 5 is a section on the line 5—5 of Figure 2.

In carrying out the invention there is provided an upwardly arched axle 1. A main frame 2 is supplied, the same including upper longitudinal bars 3 and lower longitudinal bars 4. The upper longitudinal bars 3 are mounted on the crown of the axle 1, whereas the lower longitudinal bars 4 are mounted on the ends of the axle 1. The upper longitudinal bars 3 are connected by cross bars 5, 6, 7 and 8. A draft yoke 9 is connected to the forward ends of the lower longitudinal bars 4.

A shaft 23 is journaled in the bars 4 of the main frame 2. The shaft 23 is supported for rotation in bearings 24 on the bars 4, as shown in Figure 3.

The numeral 29 marks a ground wheel journaled on one end of the axle 1.

A shaft 31 is journaled for rotation in bearings 32 depending from the upper longitudinal bars 3 of the main frame 2. The side plates 33 of a conveyor frame are mounted on the shaft 31 for vertical swinging movement. Bearings 34 are carried by the side plates 33 adjacent to the lower ends of the side plates, as shown in Figure 2. The shaft 35 is journaled in the bearings 34. A belt conveyor 36 is located between the side plates 33 of the conveyor frame and is engaged operatively with the shafts 35 and 31, the belt conveyor being upwardly and rearwardly inclined. The belt conveyor is adapted to discharge into any suitable receptacle forming no part of the present application and not shown.

The shaft 31 is connected by any suitable form of gearing 63 with one of the ground wheels of the vehicle.

Angle brackets 37 are secured to the side plates 33 of the conveyor frame at the lower end thereof, the brackets 37 embodying horizontal ground-engaging portions or shoes 38, and upwardly extended flanges 39 at the inner edges of the said portions 38. Upwardly and forwardly inclined arms 40 are secured to the brackets 37 and, therefore, to the lower ends of the side plates 33 of the conveyor frame. Links 41 are provided, the upper ends of the links being mounted pivotally on the shaft 23. Set collars 42 on the shaft 23 prevent the links 41 from shifting longitudinally of the shaft 23 (see Figure 3). A rod 43 is mounted at its ends in the upper ends of the arms 40, the lower ends of the links 41 being mounted pivotally on the rod. A shaft 44 is mounted for rocking movement in bearings 45 carried by the upper longitudinal bars 3. One of the bearings 45 is supplied with a segment 46. The shaft 44 has a lever 47 provided with a latch mechanism 48 adapted to cooperate with the segment 46. A crank arm 49 depends from the shaft 44 and is pivoted at 50 to a link 51, the lower end of the link 51 being mounted pivotally on the rod 43. Collars 52 on the rod 43 hold the link 51 in place, as shown in Figure 3.

The mechanism for digging the beets includes a pair of side diggers 53 which are of inverted trough-shape, the diggers being pointed at their forward ends, as shown at 54. An intermediate tongue or digger 55, likewise of inverted trough-shape, is located between the side diggers 53. The intermediate tongue 55 is pointed as indicated at 56, but is more bluntly pointed than are the side diggers 53. As indicated at 57, and as shown best in Figure 2, the intermediate tongue 55 extends downwardly below the side diggers 53. Reverting to Figure 4, it will be observed that the side portions of the intermediate tongue 55 are connected to the inner side walls of the lateral diggers 53 by attaching elements 58. A securing element, such as a bolt 59 extends through the digging elements 53 and 55 and is mounted in the upstanding flanges 39 of the brackets 37. The outer walls of the side diggers 53 may be connected, additionally, by bolts 60 or the like, to the flanges 39.

Owing to the specific construction of the diggers, including the parts 53 and 55, the beets will be elevated out of the ground, rather than torn or plowed out.

The lever 47 may be swung, thereby imparting rotation to the shaft 44, the crank arm 49 elevating the link 51, the rod 43 moving upwardly, and swinging on a radius defined by the length of the links 41. Since the rod 43 is mounted in the arms 40 of the conveyor frame 33, the digging instrumentalities will be raised and lowered, at the will of an operator, it being possible to engage the latch mechanism 48 with the segment 46 to hold the parts in any positions to which they may have been adjusted.

The beets, having been topped by the mechanism shown at 21, are dug by the elements 53 and 55, and are carried upwardly by the conveyor 36.

I claim:—

1. In a device of the class described, a vehicle embodying a main frame; a second frame extended downwardly from the main frame; lateral diggers carried by the second frame; and a tongue mounted on the second frame between the lateral diggers and extended downwardly below the lateral diggers.

2. In a device of the class described, a vehicle embodying a main frame; side members extended downwardly therefrom; brackets carried by the side members and provided at their inner ends with upstanding flanges; diggers located between the flanges; and means for securing the diggers to the flanges.

3. In a device of the class described, a vehicle including a main frame; a second frame extended downwardly from the main frame; lateral diggers and an intermediate digger located between the lateral diggers, all of the diggers being pointed, and the intermediate digger extending downwardly below the lateral diggers, all of the diggers being of inverted trough-shape; and means for securing the diggers to the second frame.

In testimony that I claim the foregoing as my own, I have hereto affixed my signature.

JOSEPH WOLNY.